(12) United States Patent
Oba et al.

(10) Patent No.: US 11,789,345 B2
(45) Date of Patent: Oct. 17, 2023

(54) IN-VEHICLE CAMERA

(71) Applicant: Mitsubishi Electric Corporation, Tokyo (JP)

(72) Inventors: Tetsuya Oba, Tokyo (JP); Masahiro Kanamaru, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 261 days.

(21) Appl. No.: 17/426,149

(22) PCT Filed: May 8, 2019

(86) PCT No.: PCT/JP2019/018363
§ 371 (c)(1),
(2) Date: Jul. 28, 2021

(87) PCT Pub. No.: WO2020/225869
PCT Pub. Date: Nov. 12, 2020

(65) Prior Publication Data
US 2022/0121091 A1    Apr. 21, 2022

(51) Int. Cl.
*B60R 11/04* (2006.01)
*F16B 2/20* (2006.01)
(Continued)

(52) U.S. Cl.
CPC ............ *G03B 17/561* (2013.01); *B60R 11/04* (2013.01); *F16B 2/20* (2013.01); *B60R 2011/0026* (2013.01); *B60R 2011/0071* (2013.01)

(58) Field of Classification Search
CPC .... B60R 11/04; B60R 2011/0026; F16B 2/20; G03B 17/561
See application file for complete search history.

(56) References Cited

U.S. PATENT DOCUMENTS

| 2012/0099850 A1 | 4/2012 | Onishi et al. |
| 2015/0109447 A1 | 4/2015 | Okuda |
| (Continued) | | |

FOREIGN PATENT DOCUMENTS

| DE | 11 2013 006 807 T5 | 12/2015 |
| JP | 2012-91597 A | 5/2012 |
| (Continued) | | |

OTHER PUBLICATIONS

Communication dated Apr. 5, 2022, issued in Japanese Application No. 2021-518245.
(Continued)

*Primary Examiner* — Minh Q Phan
(74) *Attorney, Agent, or Firm* — Sughrue Mion, PLLC; Richard C. Turner

(57) ABSTRACT

A camera and a bracket are configured to form: a snap-fit joint mechanism that establishes a snap-fit joint therebetween; a pressing mechanism that performs pressing, by way of a snap-fit claw, in a direction in which an interval between a mounting face and an opposite face is increased; and a holding mechanism that holds the interval between the opposite face and the mounting face against that pressing; wherein, on the snap-fit claw, a sub engagement face is created which has an inclination with respect to an insertion direction that is less than that of a main engagement face and serves to convert a part of a force at the pressing to a force in the insertion direction.

20 Claims, 15 Drawing Sheets

(51) Int. Cl.
    *B60R 11/00*       (2006.01)
    *G03B 17/56*       (2021.01)

(56) References Cited

U.S. PATENT DOCUMENTS

| | | |
|---|---|---|
| 2016/0023620 A1 | 1/2016 | Matori |
| 2016/0216595 A1* | 7/2016 | Carlson ............... G03B 17/561 |
| 2018/0093620 A1 | 4/2018 | Okuda |
| 2018/0361949 A1 | 12/2018 | Okuda |
| 2019/0168688 A1 | 6/2019 | Yamamoto et al. |

FOREIGN PATENT DOCUMENTS

| | | |
|---|---|---|
| JP | 2013-186278 A | 9/2013 |
| JP | 2013-193558 A | 9/2013 |
| JP | 2017-71334 A | 4/2017 |
| JP | 2017-172761 A | 9/2017 |
| JP | 2018-143013 A | 9/2018 |
| WO | 2018/055906 A1 | 3/2018 |

OTHER PUBLICATIONS

Written opinion for PCT/JP2019/018363 dated Aug. 13, 2019.
Office Action dated Feb. 14, 2023 in Japanese Application No. 2022-079319.
Office Action dated Mar. 29, 2023 in Chinese Application No. 201980095869.X.
Office Action dated May 31, 2023 in German Application No. 11 2019 007 290.0.
Japanese Office Action dated Jul. 4, 2023 in Japanese Application No. 2022-079319.

* cited by examiner

IN-VEHICLE CAMERA

CROSS-REFERENCE TO RELATED APPLICATIONS

This application is a National Stage of International Application No. PCT/JP2019/018363 filed May 8, 2019.

TECHNICAL FIELD

The present application relates to an in-vehicle camera.

BACKGROUND ART

An in-vehicle camera is configured with a bracket which is fixed to a vehicle body, for example, to a front window or the like, and a camera unit which is formed to be attachable/detachable to the bracket and whose lens barrel, image processing part, etc. are held in a housing. For such an in-vehicle camera, it is required that the camera unit securely keep its installation position and direction under an in-vehicle environment such as vibration, impact and the like in the vehicle, and can be easily attached/detached at the maintenance or the like.

In this regard, an in-vehicle camera is disclosed in which a spring member for pressing its camera unit is disposed on the front side or rear side of the vehicle (see, for example, Patent Document 1). In another aspect, a bracket for fixing a camera unit by a snap-fit joint is disclosed (see, for example, Patent Document 2).

CITATION LIST

Patent Document

Patent Document 1: Japanese Patent Application Laid-open No. 2013-193558 (Paragraphs 0022 to 0038; FIG. 1 to FIG. 4)

Patent Document 2: US 2016/0216595 A1 (Paragraphs 0019 to 0049; FIG. 2 to FIG. 7)

SUMMARY OF THE INVENTION

Problems to be Solved by the Invention

However, in the case of pressing the camera unit by means of the spring member, in order to securely retain the camera unit against vibrations in the front-rear direction of the vehicle, the spring member is required to support the camera unit with a load that is larger than the vibration load received therefrom. Accordingly, a strong and large spring member has to be provided, so that, at the time of attaching the camera unit, it is necessary to attach it while compressing such a strong spring. Thus, there is a possibility that the camera unit cannot be easily attached/detached. Meanwhile, the snap-fit can be expected to achieve firm fixation if its parts have been molded to have dimensions as designed; however, the molded parts may have dimensional variations and thus, when dimensional displacement occurs, even if it is small, loosening will occur. Thus, there is a possibility that the snap-fit cannot achieve secure fixation when it is subject to vibration.

The present application discloses a technique for solving the problems as described above, and an object thereof is to provide an in-vehicle camera which can be easily attached/detached and can achieve secure fixation.

Means for Solving the Problems

An in-vehicle camera disclosed in this application is an in-vehicle camera which is characterized by comprising: a bracket to be fixed to an inner face of a front or rear window of a vehicle; and a camera unit which is configured to be attachable/detachable to a mounting face of the bracket created on its side opposite to a face thereof to be fixed to the window, and which has a lens barrel whose optical axis is to extend outward of the vehicle, wherein the camera unit and the bracket constitute: a snap-fit joint mechanism that establishes a snap-fit joint therebetween according to an insertion direction that is parallel to a direction corresponding to a projection of the optical axis on the mounting face; a pressing mechanism that performs pressing, by way of a snap-fit claw that constitutes the snap-fit joint mechanism, in a direction in which an interval between the mounting face and an opposite face of the camera unit that faces the mounting face is increased; and a holding mechanism that holds the interval between the opposite face and the mounting face, against said pressing; and wherein, on the snap-fit claw, a main engagement face for achieving main engagement in the snap-fit joint, and a sub engagement face having an inclination with respect to the insertion direction that is less than that of the main engagement face, and serving to convert a part of a force at said pressing to a force in the insertion direction, are created.

Effect of the Invention

According to the in-vehicle camera disclosed in this application, a part of the pressing force is converted to an insertion-direction component for snap-fitting. This makes it possible to provide an in-vehicle camera which can be easily attached/detached and can achieve secure fixation.

MODES FOR CARRYING OUT THE INVENTION

Embodiment 1

Figure 1:
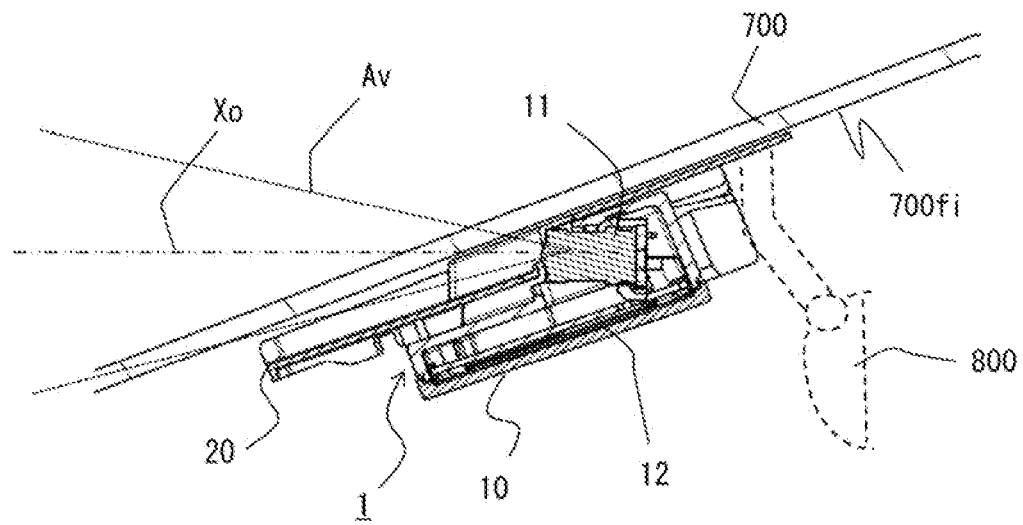
FIG. 1 is a schematic diagram showing a state of the in-vehicle camera according to Embodiment 1 attached to a vehicle.
Figure 2:
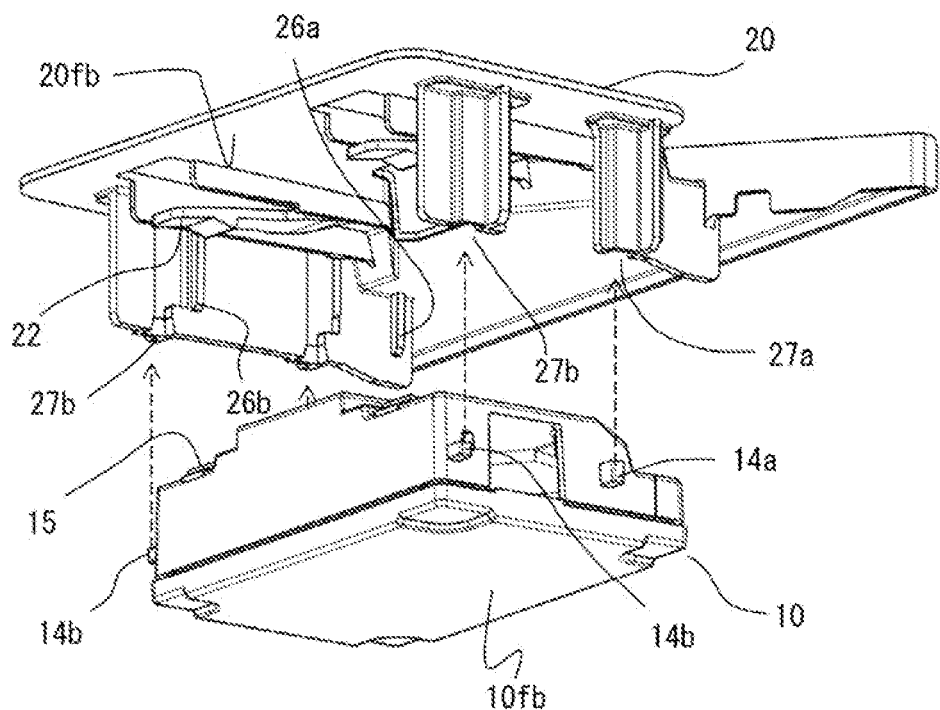
FIG. 2 is a perspective view of the in-vehicle camera according to Embodiment 1, showing a mounting direction at the time a camera unit is mounted on a bracket.
Figure 3A:
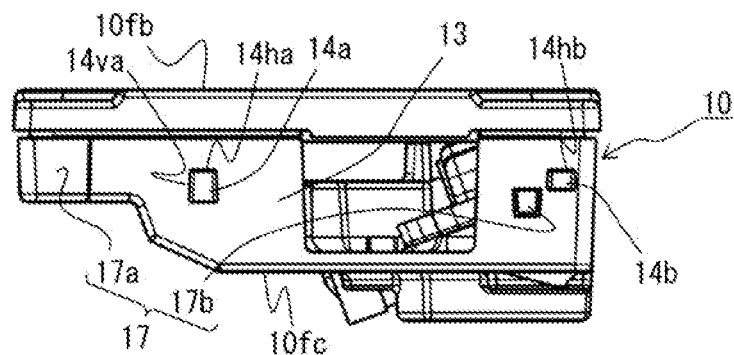
FIG. 3A and FIG. 3B are respectively a side view and a top view of a camera unit part for constituting the in-vehicle camera according to Embodiment 1.
Figure 3B:
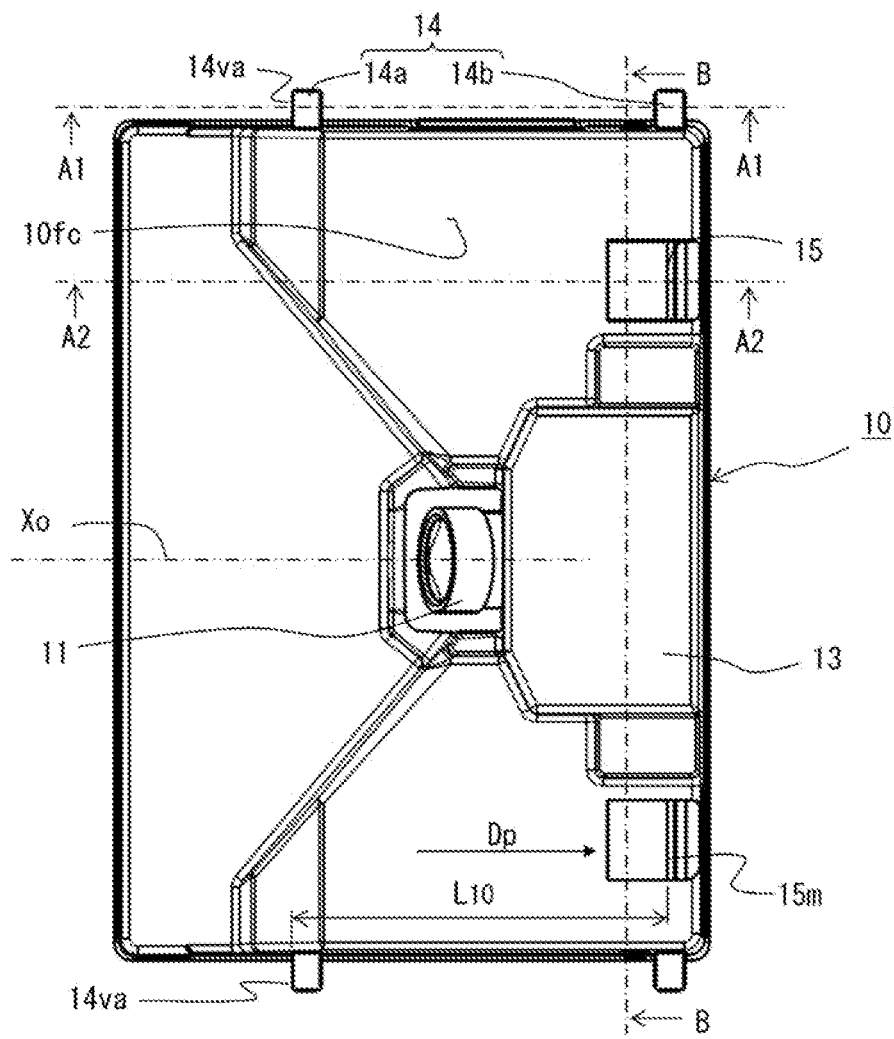
Figure 4A:
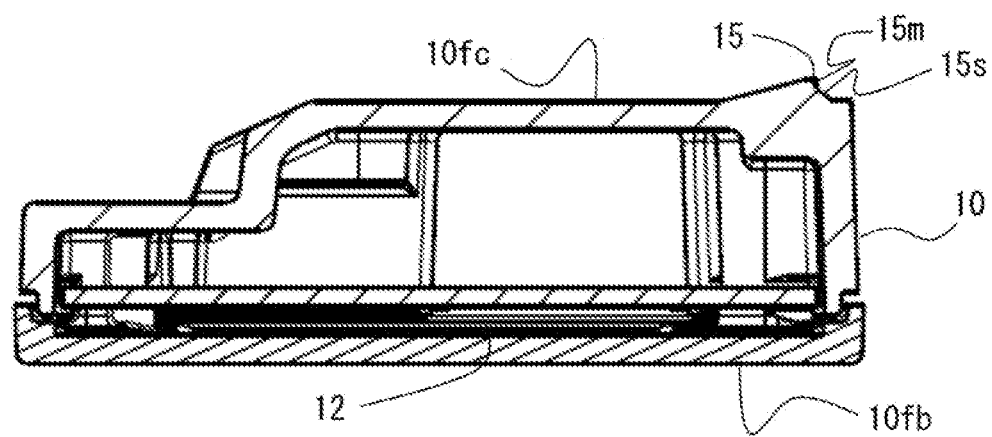
FIG. 4A and FIG. 4B are both sectional views of the camera unit part for constituting the in-vehicle camera according to Embodiment 1, taken at different cutting positions and viewed from its lateral side.
Figure 4B:
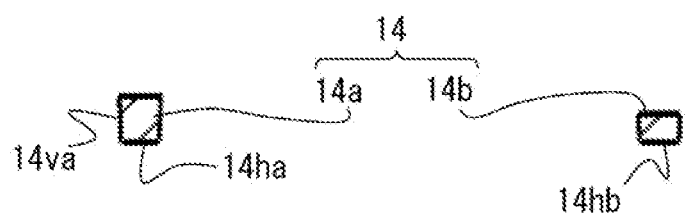
Figure 5:
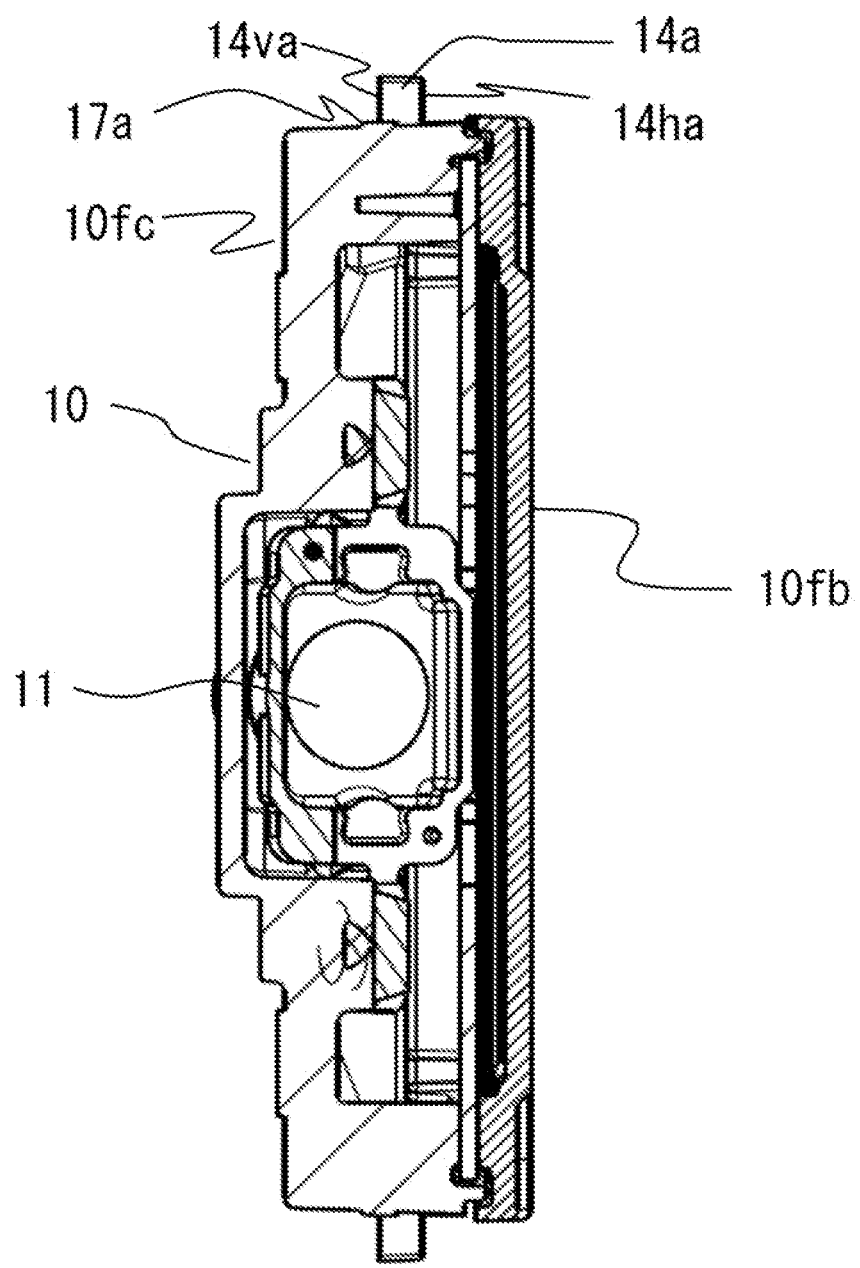
FIG. 5 is a sectional view of the camera unit part for constituting the in-vehicle camera according to Embodiment 1, viewed from its rear side.

FIG. 1 to FIG. 13 serve to illustrate an in-vehicle camera according to Embodiment 1, in which FIG. 1 is a sectional schematic diagram showing a state of the in-vehicle camera attached to a front window of a vehicle, viewed from its lateral side; FIG. 2 is a perspective view showing a mounting direction at the time a camera unit is mounted on a bracket, viewed from a side between its rear and lateral sides; and FIG. 3A shows a side view of a camera unit part and FIG. 3B shows a top view thereof, corresponding to its face (opposite face) to be attached to the bracket. Further, FIG. 4 shows sectional views of the camera unit part for constituting the in-vehicle camera, taken at different cutting positions and viewed from its lateral side, in which FIG. 4A is a sectional view cut along A2-A2 line in FIG. 3, and FIG. 4B is a sectional view cut along A1-A1 line in FIG. 3B. In addition, FIG. 5 is provided as a sectional view of the camera unit part viewed from its rear side, and is a sectional view cut along B-B line in FIG. 3B.

Figure 6:
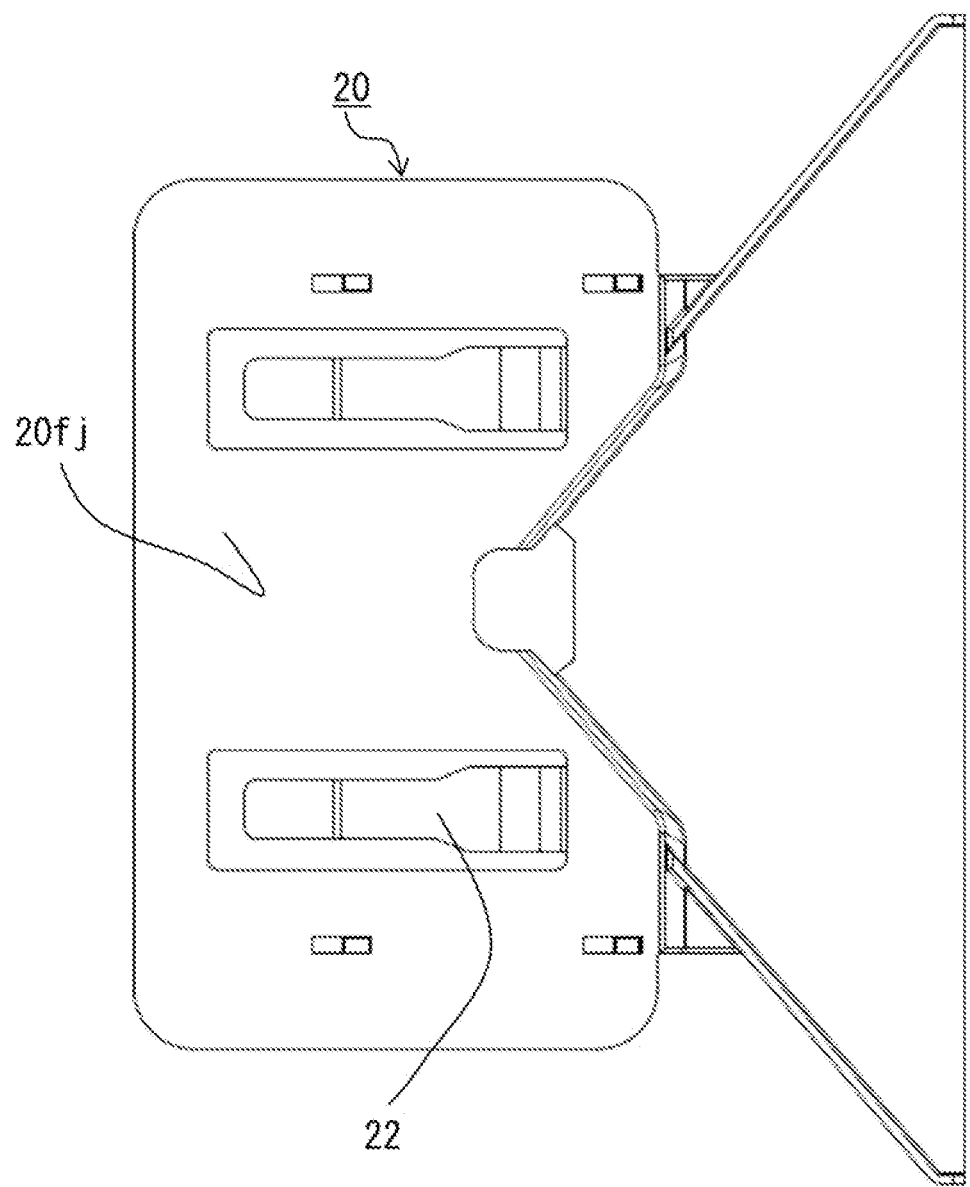
FIG. 6 is a top view of the bracket for constituting the in-vehicle camera according to Embodiment 1.
Figure 7A:
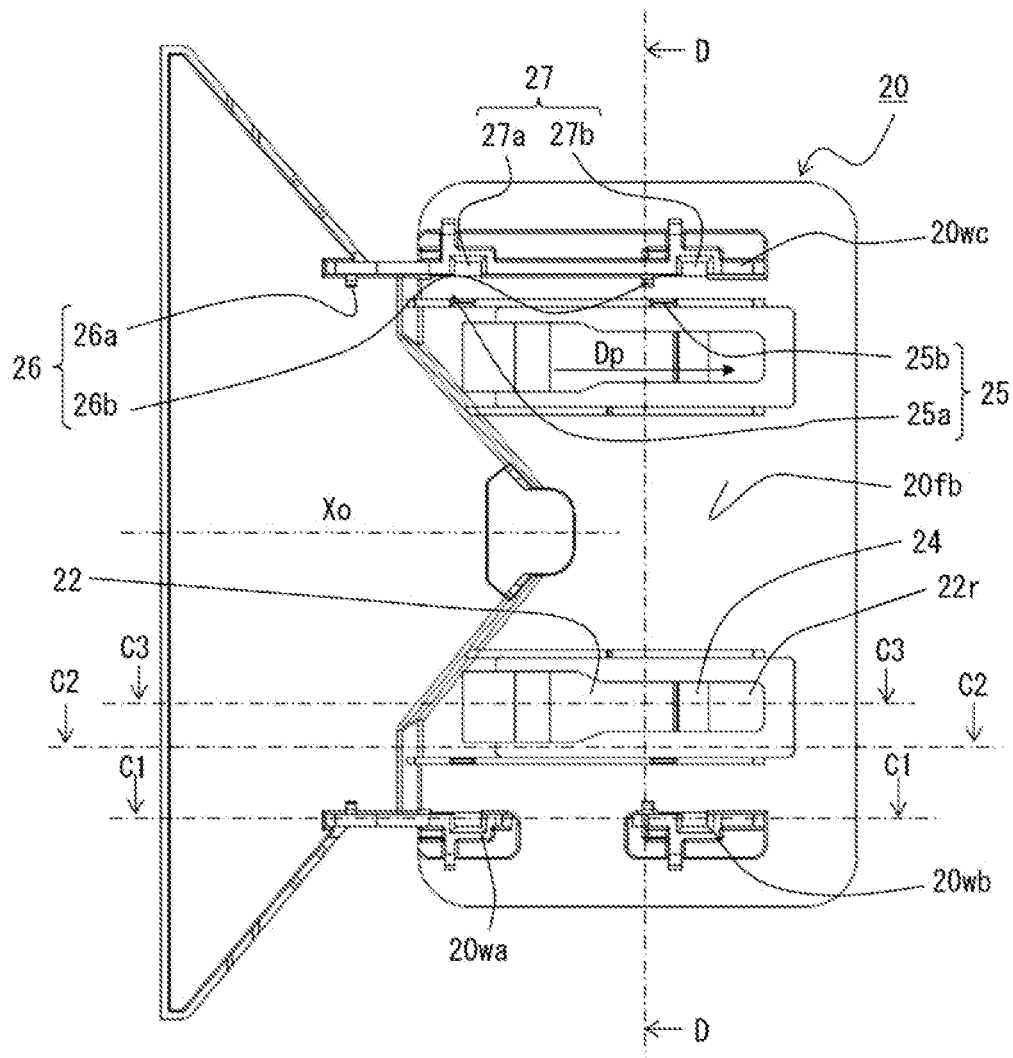
FIG. 7A and FIG. 7B are respectively a bottom view and a side view of the bracket for constituting the in-vehicle camera according to Embodiment 1.
Figure 7B:
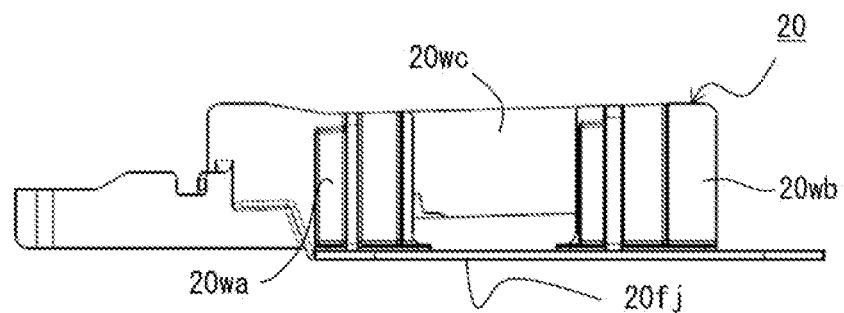
Figure 8:
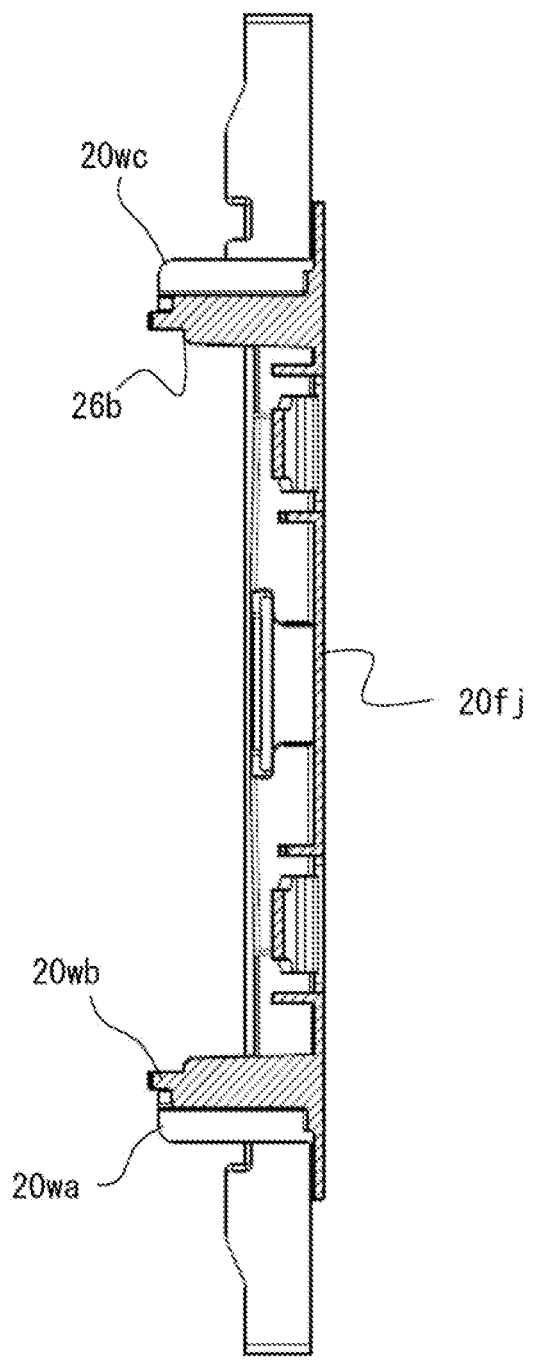
FIG. 8 is a sectional view of a bracket part for constituting the in-vehicle camera according to Embodiment 1, viewed from its rear side.
Figure 9A:
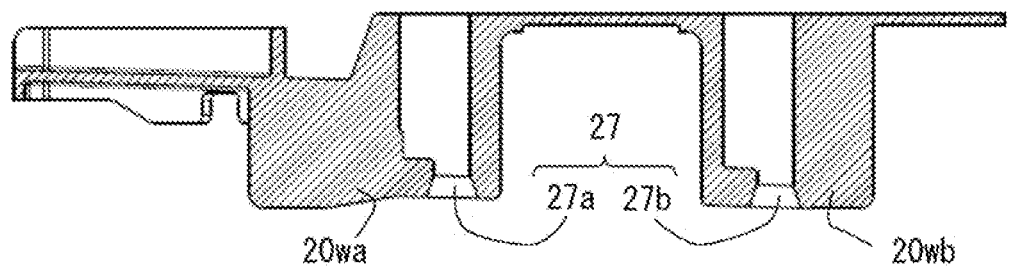
FIG. 9A, FIG. 9B and FIG. 9C are all sectional views of the bracket part for constituting the in-vehicle camera according to Embodiment 1, taken at different cutting positions and viewed from its lateral side.
Figure 9B:
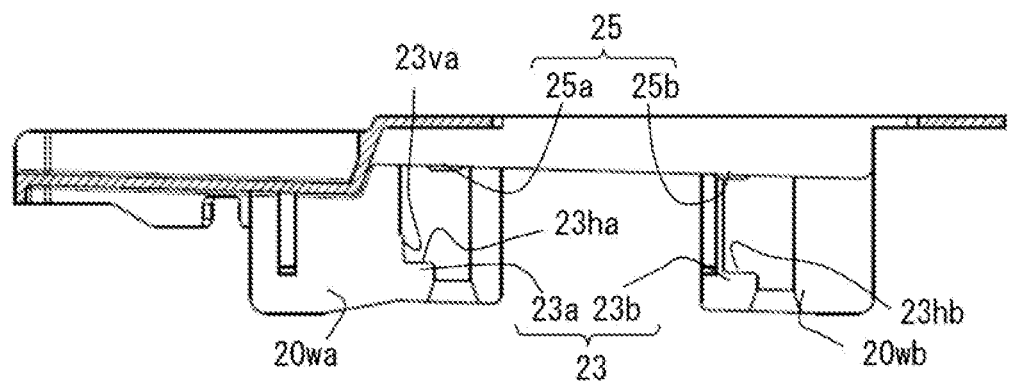
Figure 9C:
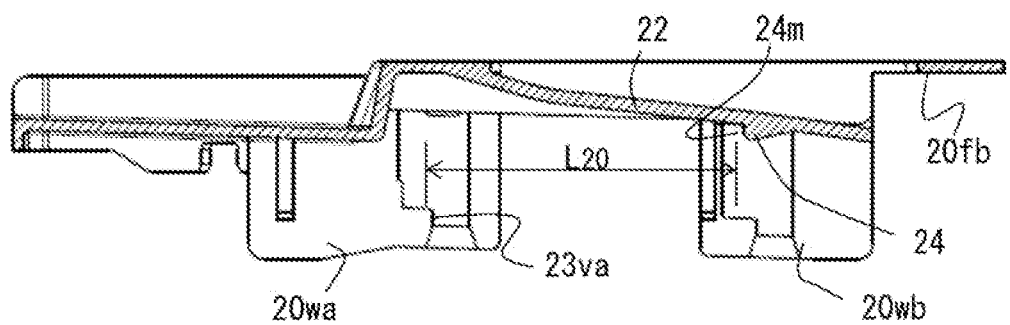
Figure 10:
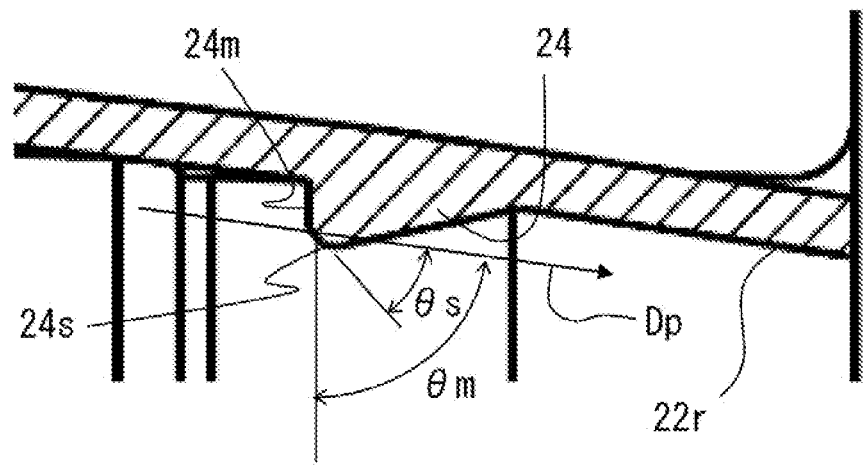
FIG. 10 is an enlarged sectional schematic view showing a configuration of a snap-fit claw on the bracket for constituting the in-vehicle camera according to Embodiment 1.

FIG. 6 is a top view of the bracket, corresponding to its face (fixing face) to be attached to the front window; FIG. 7A is a bottom view of the bracket, corresponding to its face (mounting face) for attaching the camera unit thereon; FIG. 7B is a side view of the bracket; and FIG. 8 is provided as a sectional view of the bracket viewed from its rear side, and is a sectional view cut along D-D line in FIG. 7A. Further, FIG. 9A and FIG. 9B shows sectional views of the bracket part, taken at different cutting positions and viewed from its lateral side, in which FIG. 9A is a sectional view cut along C1-C1 line in FIG. 7A; FIG. 9B is a sectional view cut along C2-C2 line in FIG. 7A; and FIG. 9C is a sectional view cut along C3-C3 line in FIG. 7A. In addition, FIG. 10 is an enlarged sectional schematic view showing a configuration of a snap-fit claw on the bracket shown in FIG. 9C.

Figure 11A:
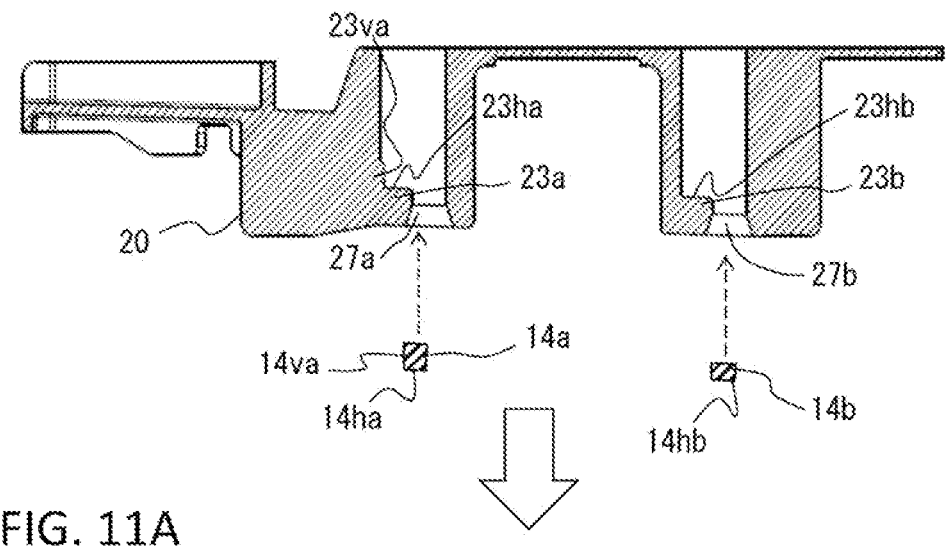
FIG. 11A to FIG. 11C are all sectional schematic views with respect to the in-vehicle camera according to Embodiment 1 viewed from its lateral side at the time the camera unit is mounted on the bracket, for showing how the positions of support protrusions of the camera unit are changed inside guide grooves of the bracket at each of mounting steps.
Figure 11B:
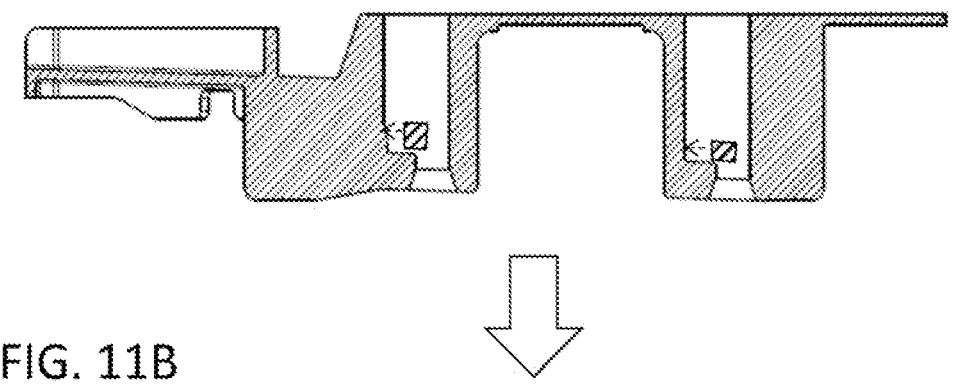
Figure 11C:
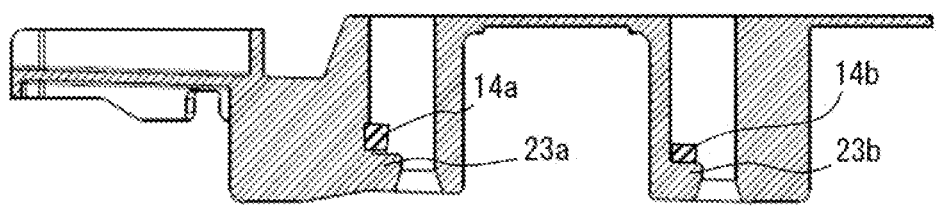

On the other hand, FIG. 11A to FIG. 11C each correspond to FIG. 4B and FIG. 9A, and are sectional schematic views at the time the camera unit is mounted on the bracket, viewed from its lateral side, for showing how the positions of support protrusions of the camera unit are changed inside guide grooves of the bracket at each of mounting steps. In addition, FIG. 12A to FIG. 12C each correspond to FIG. 4A and FIG. 9C, and are sectional schematic views at the time the camera unit is mounted on the bracket, viewed from its lateral side, for showing a positional relationship therebetween in a snap-fit region at each of mounting steps. Further, FIG. 13 corresponds to FIG. 12C, and is an enlarged sectional schematic view after the camera unit is mounted on the bracket, viewed from its lateral side, for showing a positional relationship between the snap-fit claw and an engagement recess in the snap-fit region.

It is noted that the front window subject to mounting of the in-vehicle camera is not vertical but declines toward the front side; however, in the description related to the above figures and also in the subsequent Embodiments, a face facing to the front window (inner face) is defined as a top face (upper side), and a face opposite to that face is defined as a bottom face (lower side). Further, a face facing toward the front side of the vehicle (imaging target side) is defined as a front face, a face facing toward the rear side thereof is defined as a rear face, and both faces in the right-left direction are each defined as a side face.

When an in-vehicle camera 1 according to each of Embodiments in this application is used as a front monitoring camera, it is located, as shown in FIG. 1, on a front window 700 of the vehicle and in its region that does not hinder the field of view of the driver, for example, in front of a room mirror 800. Here, it is configured with a bracket 20 to be fixed to an inner face 700fi of the front window 700, and a camera unit 10 which is attachable/detachable to the bracket 20 as shown in FIG. 2. A lens barrel 11 and an image processing part 12 of the camera unit 10 are held in its unit housing 13 having an attachment/detachment mechanism to the bracket 20.

Here, because an optical axis Xo of the lens barrel 11 is fixed at a set position and direction, a scenery ahead of the vehicle in a predetermined distance and region falls within an angle of view Av, so that it can be employed for vehicle running control, running condition record, or the like. Note that, for ease of understanding, the configuration and operations of the in-vehicle camera 1 of this application will be described on the assumption that it is fixed to the front window, as a front monitoring device; however, it may be used as a rear monitoring device in a manner fixed to a rear window. Detailed description will be given below.

<Camera Unit>

In the camera unit 10, as shown in FIG. 3A to FIG. 5, the lens barrel 11 is exposed from the top face-side of the unit housing 13 provided as an opposite face 10fc to the bracket 20 so that the optical axis Xo extends frontward (leftward in FIG. 3A and FIG. 3B). The image processing part 12 is embedded internally on a bottom face 10fb-side.

Further, on both side faces of the unit housing 13, at least a pair of support protrusions 14 to be supported by the bracket 20 are provided, and on the opposite face 10fc-side, engagement recesses 15 for making engagement with snap-fit claws 24 of the bracket are provided. In order to securely support the camera unit 10 in the up-down direction against vibrations, the support protrusions 14 are constituted by a pair of support protrusions 14a located nearer to the front side of the vehicle and a pair of support protrusions 14b located nearer to the rear side of the vehicle, so that sufficient strength is ensured by them. Further, on the both side faces, holding faces 17a, 17b (referred to collectively as holding faces 17) to be supported in the right-left direction at the mounting on the bracket 20 are created.

<Bracket>

On the top face-side of the bracket 20, as shown in FIG. 6 and FIG. 8, a flat fixing face 20*ff* for bonding the bracket to the inner face 700*fi* of the front window 700 is created. On the other hand, on the mounting face 20*fb*-side, as shown in FIG. 7A and FIG. 7B, wall parts standing from the mounting face 20*fb* are formed near the right and left outer sides thereof. The wall parts include: a front-located wall part 20*wa* and a rear-located wall part 20*wb* that are provided on the right side (lower side in FIG. 7A); and a wall part 20*wc* extending in the front-rear direction that is provided on the left side (upper side in that figure).

On the wall parts, in order to clamp the respective holding faces 17a, 17b from the right and left directions at the mounting of the camera unit 10, longitudinal protrusions 26a, 26b (referred to collectively as longitudinal protrusions 26) are provided that protrude toward the horizontally inner side and vertically extend from the mounting face 20*fb*. Further, as shown in FIG. 9A, guide grooves 27a, 27b (referred to collectively as guide grooves 27) are created that are matched with the support protrusions 14a, 14b of the camera unit 10, respectively, and each serve as a guide at the time of insertion.

Further, as shown in FIG. 9C, elastic pressing parts 22 are formed that extend so as to become farther from the mounting face 20*fb* toward the rear side, and each have elasticity to force the unit housing 13, when it is mounted, in a push back direction like a leaf spring. At the head portion of the elastic pressing part 22, the snap-fit claw 24 for establishing a snap-fit joint with the engagement recess 15 of the unit housing 13 is formed. Note that details of each of the snap-fit claw 24 and the engagement recess 15 and how they are combined together will be described later.

Furthermore, as shown in FIG. 9B, at the inlet portions (lower side portions in the figure) of the guide grooves 27, hook-shaped parts 23a, 23b (referred to collectively as hook-shaped parts 23) are formed which protrude toward the rear side (right side in that figure) for hooking the support protrusions 14 to thereby prevent them from being released.

Further, between the wall parts and the elastic pressing parts 22, sliding convex parts 25a, 25b (referred to collectively as sliding convex parts 25) each having a constant height from the mounting face 20*fb* and extending by a predetermined length in the front-rear direction, are provided to form a pair on each of the front and rear sides. The sliding convex parts 25 are provided for making contact with the opposite face 10*fc* at the time of mounting the camera unit and for causing the camera unit 10 to smoothly move in the front-rear direction while they are in contact with the opposite face 10*fc*.

Based on the configuration described above, more detailed configuration will be described. As shown in FIG. 10, on the snap-fit claw 24, a main engagement face 24m is provided that is substantially orthogonal to an insertion direction Dp and commonly used in order to prevent releasing when a snap-fit joint is established. According to the in-vehicle camera 1 of this application, in addition to the main engagement face 24m, a sub engagement face 24s is created whose inclination θs with respect to the insertion direction Dp is less than an inclination θm of the main engagement face 24m and also less than 90 degrees.

Correspondingly, as shown in FIG. 4A, the engagement recess 15 of the camera unit 10 is provided with a sub receiving face 15s matched with the sub engagement face 24s, in addition to a main receiving face 15m matched with the main engagement face 24m.

Figure 12A:
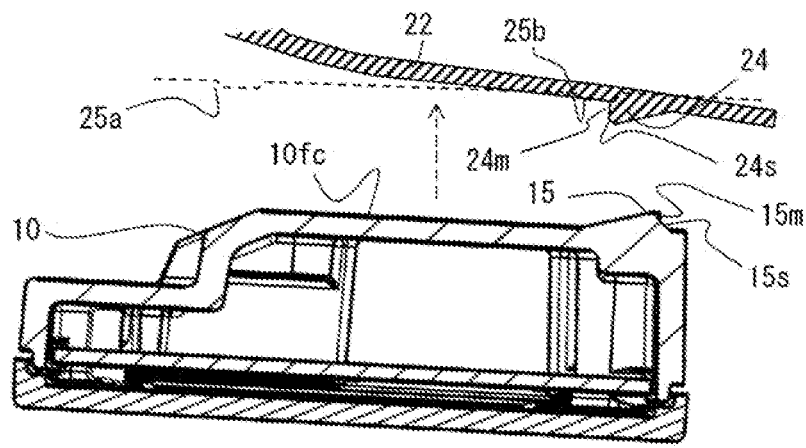
FIG. 12A to FIG. 12C are all sectional schematic views with respect to the in-vehicle camera according to Embodiment 1 viewed from its lateral side at the time the camera unit is mounted on the bracket, for showing a positional relationship therebetween in a snap-fit region at each of mounting steps.

In light of the above-described configuration, mounting operations and detailed configuration will be described. As has been described using FIG. 2, the camera unit 10 is mounted upward to the bracket 20 adhered to the front window 700, from its lower side. At this time, as shown in FIG. 11A and FIG. 12A, the support protrusions 14a, 14b are positioned to coincide with the guide grooves 27a, 27b of the bracket 20 and then inserted therein, respectively. As a result, portions of the camera unit 10 that are raised from the opposite face 10*fc* and form the engagement recesses 15, push the elastic pressing parts 22 of the bracket 20.

Figure 12B:
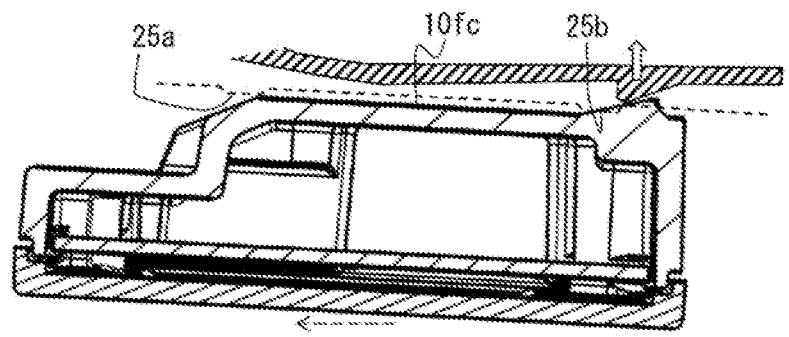

When the camera unit 10 is further pushed upward, as shown in FIG. 12B, the opposite face 10*fc* of the unit housing 13 abuts against the sliding convex parts 25 of the bracket 20. On this occasion, as shown in FIG. 11B, the support protrusions 14a, 14b have entered in the guide grooves 27 up to positions where their lateral support faces 14ha, 14hb are higher than lateral holding faces 23ha, 23hb of the hook-shaped parts 23a, 23b in the guide grooves 27. Here, on each of the right and left sides, the sliding convex part 25a nearer to the vehicle front side and the sliding convex part 25b nearer to the vehicle rear side are in contact with the opposite face 10*fc* at their longitudinal contact faces extending in the front-rear direction, so that the sliding convex parts 25 serve to guide the smooth sliding movement of the camera unit 10 in the front-rear direction (right-left direction in the figure).

In that state, when the camera unit 10 is slid toward the vehicle front side, as shown in FIG. 11C, the lateral support faces 14ha, 14hb of the support protrusions 14 are positioned, respectively, above the lateral holding faces 23ha, 23hb of the hook-shaped parts 23 each provided with an open space spreading in the insertion direction Dp. When the camera unit 10 is further slid toward the vehicle front side, a vertical support face 14va of the support protrusion 14a nearer to the vehicle front side, abut on an abutting face 23va of the hook-shaped part 23a.

Here, even if the hand is released from the camera unit 10 to remove the pressing force in the mounting direction, each elastic pressing part 22 presses the camera unit 10 in a direction away from that part, so that the lateral support faces 14ha, 14hb are subject to pressing loads from the lateral holding faces 23ha, 23hb.

Figure 12C:
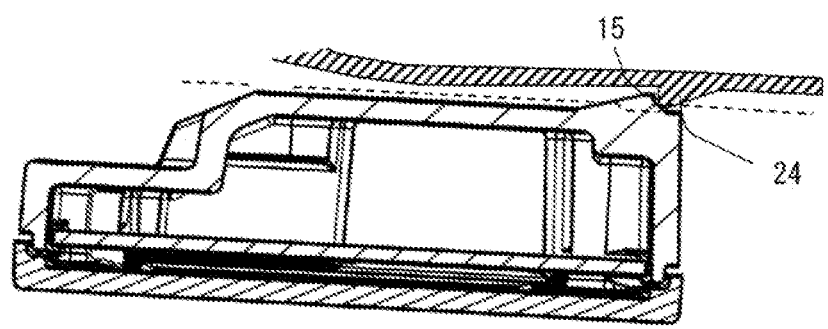

At this time, as shown in FIG. 12C, each snap-fit claw 24 of the bracket 20 is engaged with the engagement recess 15 of the camera unit 10. On this occasion, because of the above sliding movement toward the vehicle front side, the holding faces 17 placed on the respective side faces of the housing of the camera unit 10 are clamped from the both sides by the longitudinal protrusions 26 placed on the side faces of the bracket 20, to establish a mating state. Further, as described above, because the elastic pressing part 22 presses the opposite face 10*fc*, the lateral support faces 14ha, 14hb are subject to pressing loads from the lateral holding faces 23ha, 23hb. Namely, a mechanical support mechanism for suppressing displacement between the camera unit 10 and the bracket 20 in any of four directions (upward, downward, rightward and leftward directions) perpendicular to the front-rear direction, is established.

Here, description will be made about a snap-fit joint for suppressing the displacement in the frontward or rearward direction of the vehicle, to be established by the snap-fit claw 24 and the engagement recess 15. The faces of the camera unit 10 where it can be clamped in the front-rear direction, are the vertical support face 14va of the support protrusion 14a and the main receiving face 15m of the engagement recess 15. The corresponding faces of the bracket 20 for clamping the camera unit in the front-rear direction, are the abutting face 23va of the hook-shaped part 23a and the main engagement face 24m of the snap-fit claw 24.

However, each of a dimension $L_{10}$ between the vertical support face 14va and the main receiving face 15m (FIG. 3B) and a dimension $L_{20}$ between the abutting face 23va and the main engagement face 24m (FIG. 9C) may possibly vary depending on the fabrication accuracy of the corresponding parts. In particular, when the elastic pressing part 22 is composed as a resin mold product, the dimension $L_{20}$ between the abutting face 23va and the main engagement face 24m of the snap-fit claw 24 is assumed to have a wide range of variations due to leaning deformation.

Thus, when a usual snap-fit structure is constituted, if the dimension $L_{20}$ becomes shorter than the dimension $L_{10}$ to the extent beyond an allowable range, such a snap-fit joint as shown in FIG. 12C cannot be established. Instead, if the dimension $L_{20}$ becomes longer than the dimension $L_{10}$ to the extent beyond an allowable range, a gap remains open between the main engagement face 24m and the main receiving face 15m, so that there is a possibility that the main engagement face 24m and the main receiving face 15m may hit each other hard when subject to vibration, to cause disengagement. In this respect, it is conceivable to make the protrusion height of the main engagement face 24m higher to thereby suppress such disengagement. If this is the case, however, the elastic pressing part 22 is required to be largely bent at the time of achieving engagement, so that the necessary force for insertion increases and the force at the time of detachment also increases, to thereby cause difficulty in use.

To deal with that problem, on the snap-fit claw 24 which serves with the engagement recess 15 to establish the snap-fit joint according to the in-vehicle camera 1 of this application, the sub engagement face 24s is created whose inclination θs with respect to the insertion direction Dp is less than the inclination θm of the main engagement face 24m and also less than 90 degrees. In addition, on the unit housing 13, the main receiving face 15m and the sub receiving face 15s are created at the positions to be opposite to the main engagement face 24m and the sub engagement face 24s, respectively.

Figure 13:
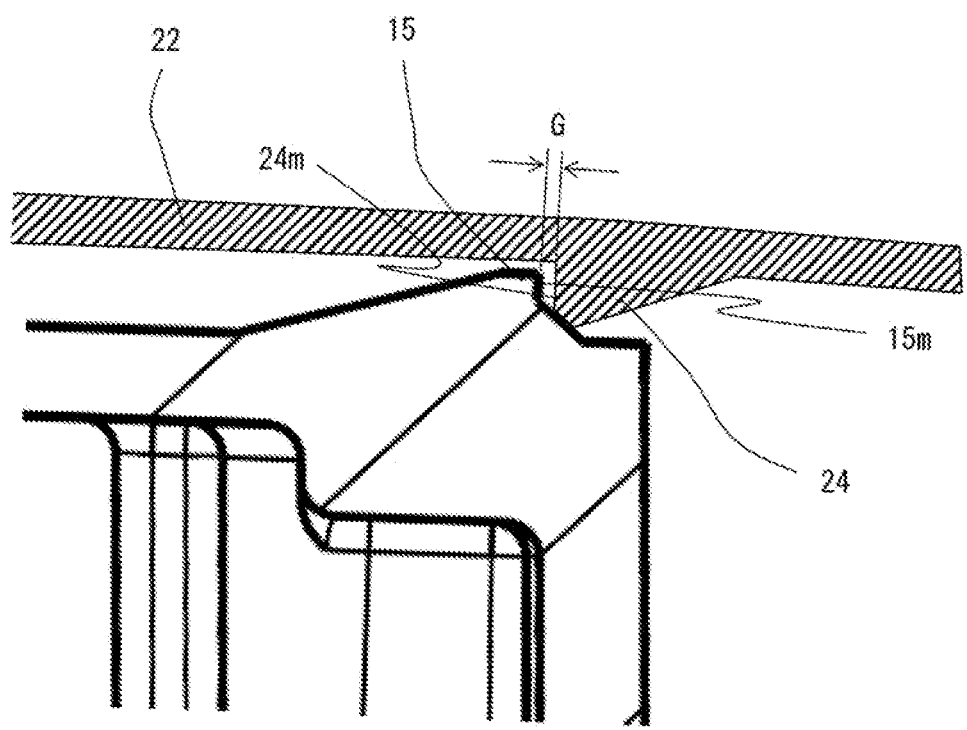
FIG. 13 is an enlarged sectional schematic view with respect to the in-vehicle camera according to Embodiment 1 viewed from its lateral side after the camera unit is mounted on the bracket, for showing a positional relationship therebetween in the snap-fit region.

Further, as shown in FIG. 13, the dimension $L_{10}$ and the dimension $L_{20}$ are set so that a gap G determined in consideration of dimensional variations is generated between the main engagement face 24m and the main receiving face 15m, for example, a relationship of $L_{20}=L_{10}+G$, is satisfied. The gap G has been determined so that a gap can be securely ensured even if the dimension $L_{20}$ becomes minimum and the dimension $L_{10}$ becomes maximum within the dimensional tolerances of the corresponding parts. Accordingly, in a normal state, although the main engagement face 24m and the main receiving face 15m are spaced apart from each other, the sub engagement face 24s and the sub receiving face 15s are securely in contact with each other by a vertical force due to elastomeric force of the elastic pressing part 22.

At that time, as has been described using FIG. 10, the sub engagement face is inclined with respect to the insertion direction Dp with the inclination θs that is less than 90 degrees, to be directed to act against the releasing, so that a component of force in the release-prevention direction is generated and thus, a force for pushing the snap-fit claw 24 in the insertion direction Dp is always exerted. Thus, even when a large load such as an impact load or the like is imposed, because a force against the releasing is involved between the sub engagement face 24s and the sub receiving face 15s, displacement will not easily occur in the releasing direction. Further, even if the main engagement face 24m and the main receiving face 15m hit each other, the impact power has been mitigated during the gap therebetween is narrowed until they hit each other, so that the releasing can securely be prevented by the main engagement face 24m and the main receiving face 15m, and the displacement in the frontward or rearward direction can be restricted within up to the gap G. Accordingly, it is also possible to reduce the height of the main engagement face 24m to be lower than that in the case of usual snap-fitting.

Here, as aforementioned, it is appropriate that the sub engagement face 24s is inclined so that a vertical force can be imposed thereon and a part of the thus-imposed force changes to be directed against the releasing direction. Accordingly, the inclination θs is desired to be, for example, around 45 degrees with respect to the insertion direction Dp and, on the assumption that it is less than the inclination θm of the main engagement face 24m, it is desired to be an angle closer to 45° than to 90° and 0°.

Further, since it is just required that a part of the force changes to be directed against the releasing direction, the sub engagement face 24 is not necessarily required to be a flat face and may be curved.

Even when this is the case, a projection area thereof on a plane perpendicular to the insertion direction Dp is desired to be one-fourth or more, preferably one-third or more, of that of the main engagement face 24m.

Note that, in order to stably fix the camera unit 10, it is required to support the camera unit 10 at its gravity center portion or at its positions symmetric about the gravity center. On the other hand, in many cases, the lens barrel 11, which constitutes a majority of the camera unit 10 in weight, is located nearly at the center of the camera unit 10. Thus, with respect to the front-rear and right-left dimensions of the unit housing 13, in order to ensure a wide field of view, the right-left dimension should be large while the front-rear dimension should be small. Accordingly, there is a small support space around the gravity center, and thus, it is difficult to provide a snap-fit mechanism therearound. Thus, in order to stably fix the camera unit 10, it is desired to provide a pair of such mechanisms symmetrically about a plane (referred to, for example, as an optical-axis plane) perpendicular to the opposite face 10fc and including the optical axis Xo.

Namely, the foregoing configuration makes it possible to stably fix the camera unit 10 in the up-down, right-left and front-rear directions of the vehicle, and thus to attach the camera unit 10 to the bracket 20 at a predetermined position and direction. Further, at the time of detachment, it is easily possible to detach the camera unit 10 by pushing an engagement releasing portion 22r at the head of the snap-fit claw 24 toward the front window 700-side and by sliding the camera unit toward the vehicle rear side.

Here, with respect in particular to a front monitoring camera among in-vehicle cameras, it is required to be located on the vehicle-interior side of the front window 700 around a location corresponding to a center of the vehicle and to be securely fixed at a predetermined position and direction, in order to cause a predetermined region ahead of the vehicle to fall within the angle of view Av of the camera. Furthermore, in many cases, around the location on the front window 700 corresponding to the center of the vehicle, the front monitoring camera is attached in a region behind the room mirror 800 provided as a dead zone when viewed by the driver, in order to ensure front visibility of the driver. Accordingly, it is required for the front monitoring camera to decrease its occupancy area on the front window as much as possible and to be formed thin by reducing its expansion toward the vehicle interior.

With respect to such requirements, according to the in-vehicle camera 1 of this application, secure fixation is achieved without using an extra space or a large member, and this makes it possible to achieve downsizing. Accordingly, in the case of the front monitoring camera, the occupancy area on the front window 700 can be decreased as much as possible and the expansion toward the vehicle interior can be reduced, so that, at the time of attachment to the vehicle and at the time of maintenance, the camera unit 10 can be easily attached/detached. Thus, a more remarkable effect is created.

Embodiment 2

In Embodiment 1, a case has been described where the mutually engaged faces in the snap-fit joint are, in the right-left direction, orthogonal to the insertion direction for snap-fitting. In this Embodiment, a case will be described where the mutually engaged faces in the snap-fit joint are, in the right-left direction, oblique to a plane perpendicular to the insertion direction for snap-fitting.

Figure 14A:
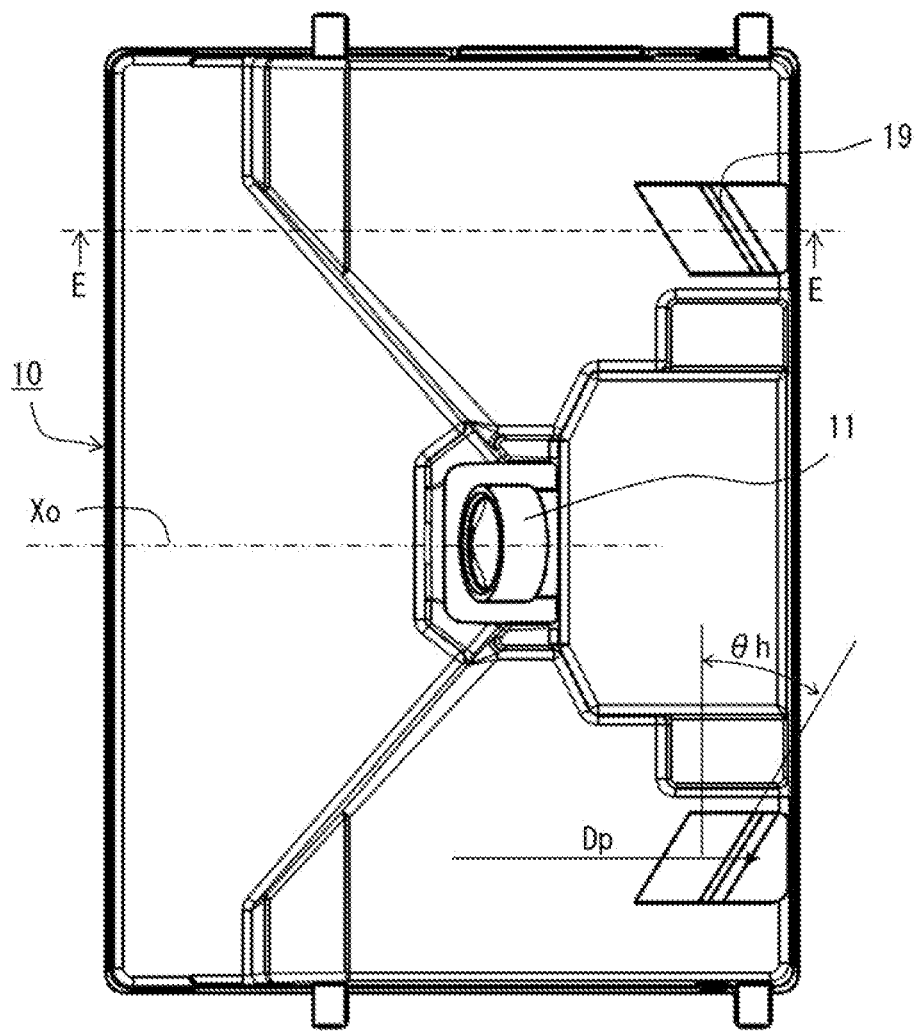
FIG. 14A and FIG. 14B are respectively a top view of a camera unit part for constituting the in-vehicle camera according to Embodiment 2 and a sectional view thereof viewed from its lateral side.
Figure 14B:
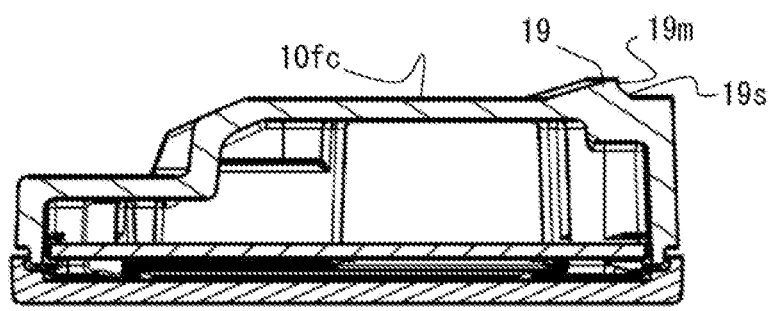
Figure 15:
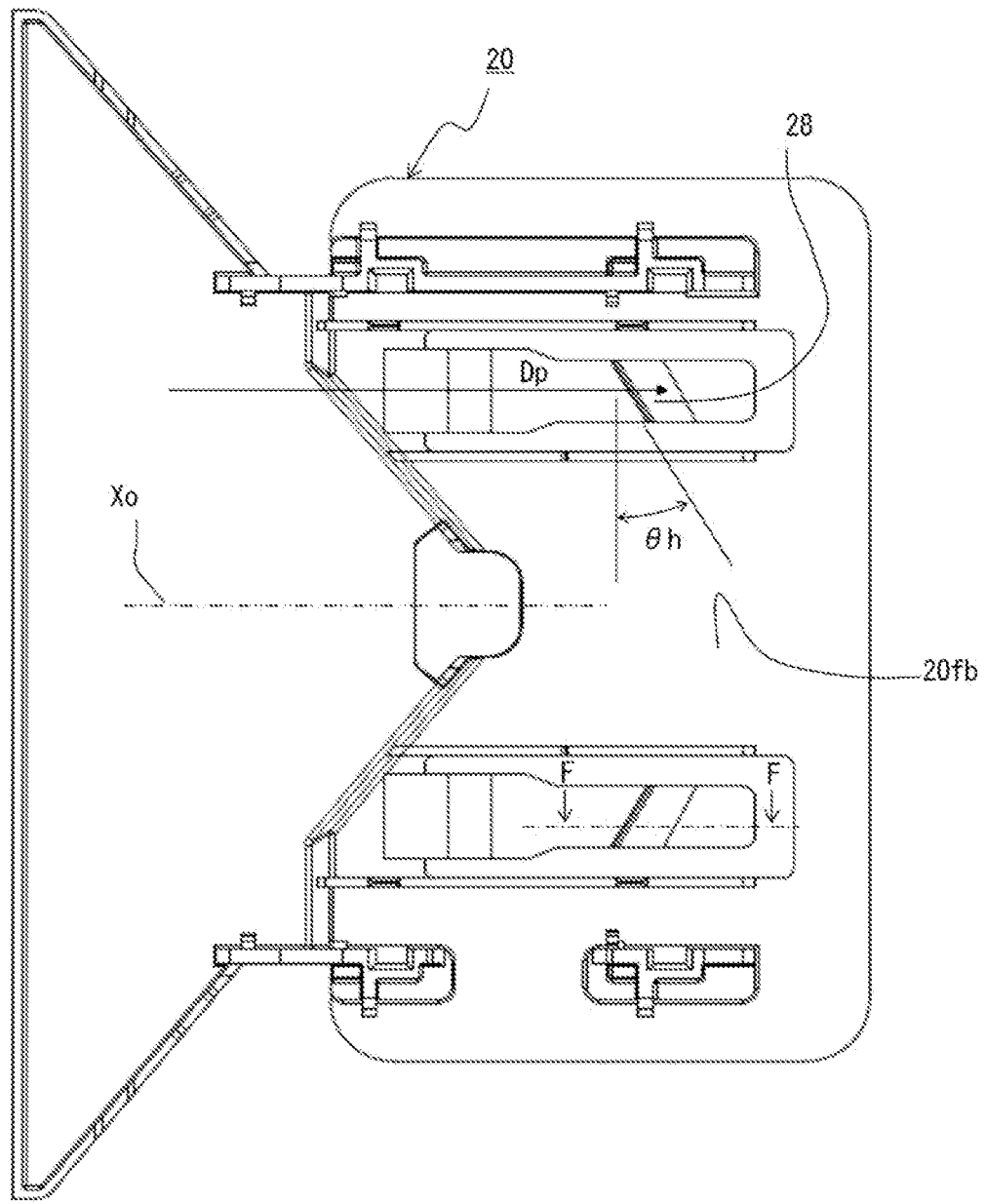
FIG. 15 is a bottom view of a bracket part for constituting the in-vehicle camera according to Embodiment 2.
Figure 16:
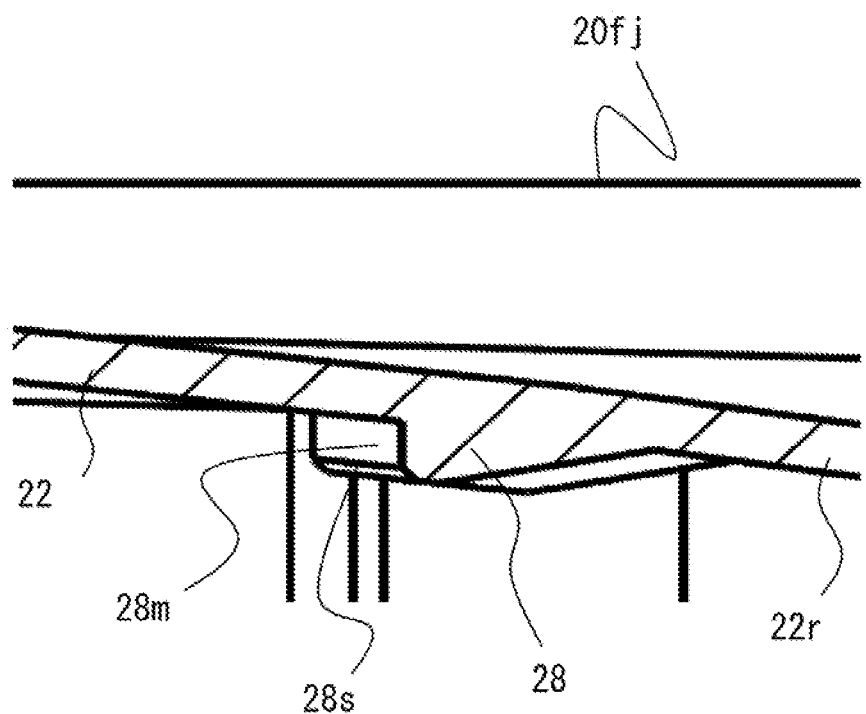
FIG. 16 is an enlarged sectional schematic view showing a configuration of a snap-fit claw on the bracket for constituting the in-vehicle camera according to Embodiment 2, viewed from its lateral side.

FIG. 14A to FIG. 16 serve to illustrate an in-vehicle camera according to Embodiment 2, in which FIG. 14A is a top view of a camera unit; FIG. 14B is provided as a sectional view thereof viewed from its lateral side, and is a sectional view cut along E-E line in FIG. 14A, FIG. 15 is a bottom view of a bracket; and FIG. 16 is provided as an enlarged sectional schematic view showing a configuration of a snap-fit claw on the bracket, and is a sectional view cut along F-F line in FIG. 15. Note that, in the in-vehicle camera according to Embodiment 2, the other configuration than that of portions related to the mutually engaged faces for snap-fitting is similar to the corresponding configuration described in Embodiment 1, so that detailed description thereof will not be duplicated.

In an in-vehicle camera 1 according to Embodiment 2, as shown in FIG. 14 to FIG. 16, in the right-left direction, a main receiving face 19*m* of each of engagement recesses 19 and a main engagement face 28*m* of each of snap-fit claws 28 are each configured to have an inclination θh that is less than 90 degrees with respect to a plane perpendicular to the insertion direction Dp. Further, the snap-fit claws 28 and the engagement recesses 19 to be located at both right and left sides are symmetrically located about the optical-axis plane.

According to this configuration, because of a sub engagement face 28*s* and a sub receiving face 19*s*, when it is subject to a pressing load from the elastic pressing part 22, components of that load acting in the right and left directions toward the optical axis Xo are imposed in the respective snap-fit mechanisms on the right and left sides, in a symmetric manner about a plane including the optical axis Xo and the vertical line. Thus, the camera unit 10 can be centered with respect to the right-left direction of the vehicle and about the optical axis Xo, so that it is possible to fix the camera unit 10 at a predetermined position and direction, more accurately.

Modified Examples

It is noted that, in Embodiment 2, a case has been described where the main engagement faces 28 on the right and left sides are inclined so that an interval therebetween is narrowed outward in the insertion direction Dp at the time of establishing a snap-fit joint; however, this is not limitative. For example, the main engagement faces 28 on the right and left sides may be inclined so that an interval therebetween is widened outward in the insertion direction Dp. Even in this case, a part of the pressing load, namely, its components acting in the right and left directions outward from optical axis Xo, are imposed in a symmetric manner about the above plane. Thus, the camera unit 10 can be centered with respect to the right-left direction of the vehicle and about the optical axis Xo.

It should be noted that, in this application, a variety of exemplary embodiments and examples are described; however, every characteristic, configuration or function that is described in one or more embodiments, is not limited to being applied to a specific embodiment, and may be applied singularly or in any of various combinations thereof to another embodiment. Accordingly, an infinite number of modified examples that are not exemplified here are supposed within the technical scope disclosed in the present description. For example, such cases shall be included where at least one configuration element is modified; where at least one configuration element is added or omitted; and furthermore, where at least one configuration element is extracted and combined with a configuration element of another embodiment.

For example, the snap-fit claw 24 and the engagement recess 15 for constituting the snap-fit mechanism may be provided on the camera unit 10-side and the bracket 20-side, respectively, and also the support protrusion 14 is not limited to the case where it is protruded from the side face, and may be protruded like a hook from the opposite face 10*fc*-side. Basically, it suffices to have: a pressing mechanism that performs pressing, by way of the snap-fit claw 24 having the sub engagement face 24*s* and whose insertion direction Dp is a front-rear direction, in a direction in which the bracket 20 and the camera unit 10 are pulled away from each other; and a holding mechanism that holds the interval therebetween against the pressing.

As described above, the in-vehicle camera 1 according to each of Embodiments is an in-vehicle camera 1 which is configured to comprise: the bracket 20 to be fixed to the inner face 700*fi* of a front or rear window (for example, the front window 700) of a vehicle; and the camera unit 10 which is configured to be attachable/detachable to the mounting face 20*fb* of the bracket 20 created on its side opposite to the fixing face 20*fj* to be fixed to the front window 700, and which has the lens barrel 11 whose optical axis Xo is to extend outward of the vehicle through the front window 700 subjected to fixing, wherein the camera unit 10 and the bracket 20 constitute: a snap-fit joint mechanism (the snap-fit claw 24 or 28 and the engagement recess 15 or 19) that establishes a snap-fit joint therebetween according to the insertion direction Dp that is parallel to a direction corresponding to a projection of the optical axis Xo on the mounting face 20*fb*; a pressing mechanism (the elastic pressing part 22) that performs pressing, by way of the snap-fit claw 24 or 28 that constitutes the snap-fit joint mechanism, in a direction in which an interval between the mounting face 20fb and the opposite face 10fc of the camera unit 10 that faces the mounting face 20fb is increased; and a holding mechanism (the support protrusion 14 and the hook-shaped part 23) that holds the interval between the opposite face 10fc and the mounting face 20fb, against said pressing; and wherein, on the snap-fit claw 24, the main engagement face 24m for achieving main engagement in the snap-fit joint, and the sub engagement face 24s having the inclination θs with respect to the insertion direction Dp that is less than that (inclination θm) of the main engagement face 24m and serving to convert a part of a force at said pressing to a force (component) in the insertion direction Dp, are created. Thus, even if there is the gap G between the main engagement face 24m and the main receiving face 15m, a force directed against releasing of the snap-fit joint is generated by the sub engagement face 24, so that it is possible to provide an in-vehicle camera which can be easily attached/detached and can achieve secure fixation, even with dimensional variations.

In particular, when, as the pressing mechanism, the elastic pressing part 22 is provided on which the snap-fit claw 24 is formed at its head portion and which extends from the mounting face 20fb so as to become farther from the mounting face 20fb as it goes forward in the insertion direction Dp, said elastic pressing part being elastically deformed in a fitting direction to the opposite face 10fc when the opposite face 10fc is made close to the mounting face 20fb; and when, as the holding mechanism, the support protrusion formed on the camera unit 10 and protruding in a direction parallel to the opposite face 10fc, and the hook-shaped part 23 formed on the bracket 20 are provided, said hook-shaped part being provided with an open space spreading in a same direction as the insertion direction Dp, and serving to hook the support protrusion 14 when the snap-fit joint is established; the operation for establishing the snap-fit joint and the operation for the holding mechanism can be achieved with one-touch action. This simplifies the attachment/detachment significantly.

In particular, when the inclination θs of the sub engagement face 24s with respect to the insertion direction Dp is set to an angle closer to 45° than to 90° and 0°, it is possible to securely receive the pressing force and to securely generate, from the received pressing force, a force directed against the releasing of the snap-fit joint.

In another aspect, when the projected area of the sub engagement face 24s on a plane perpendicular to the insertion direction Dp is one-fourth or more of the projected area of the main engagement face 24m on that plane, it is possible to sufficiently generate a force directed against the releasing of the snap-fit joint. Further, when it is one-third or more thereof, it is possible to generate a force directed against the releasing of the snap-fit joint, more securely.

When a pair of the snap-fit joint mechanisms are provided to be plane-symmetric about an optical-axis plane perpendicular to the opposite face 10fc and including the optical axis Xo, and to be apart from the lens barrel 11, it is possible to stably support the camera unit 10.

At that time, when, in the snap-fit joint mechanism, a receiving face (main receiving face 15m) of the engagement recess 15 for achieving engagement with the main engagement face 24m, is configured to form an angle θh in a plane parallel to the opposite face 10fc so as to be orthogonal to the optical-axis plane, it is possible to retain the snap-fit joint even against a large impact.

Instead, when, in the snap-fit joint mechanism, a receiving face (main receiving face 19m) of the engagement recess 19 for achieving engagement with the main engagement face 28m, is configured to form an angle θh in a plane parallel to the opposite face 10fc so as to be oblique to a plane perpendicular to the optical-axis plane, a centering function is exerted at the time of the mounting, and this makes the positioning more adequate.

When the bracket 20 and the camera unit 10 are configured to form a mating structure (the holding face 17 and the longitudinal protrusion 26) by which they are mated with each other in a direction that is perpendicular to a direction in which the opposite face 10fc goes away from the mounting face 20fb, and that is also perpendicular to the insertion direction Dp, it is possible to restrict the camera unit 10 from being displaced relative to the bracket 20 in six directions, namely, frontward, rearward, rightward, leftward, upward and downward directions.

DESCRIPTION OF REFERENCE NUMERALS AND SIGNS

1: in-vehicle camera, 10: camera unit, 10fc: opposite face, 11: lens barrel, 14: support protrusion, 14ha: lateral support face, 14va: vertical support face, 15: engagement recess, 15m: main receiving face (receiving face), 15s: sub receiving face, 17: holding face (mating structure), 19: engagement recess, 20: bracket, 20fj: fixing face, 20fb: mounting face, 22: elastic pressing part, 23: hook-shaped part, 24: snap-fit claw, 24m: main engagement face, 24s: sub engagement face, 26: longitudinal protrusion (mating structure), 28: snap-fit claw, 28m: main engagement face, 28s: sub engagement face, 700: front window (window), 800: room mirror, Av: angle of view, G: gap, θh: inclination, θm: inclination, θs: inclination, Xo: optical axis.

The invention claimed is:

1. An in-vehicle camera which comprises: a bracket to be fixed to an inner face of a front or rear window of a vehicle; and a camera which is configured to be attachable/detachable to a mounting face of the bracket created on its side opposite to a face thereof to be fixed to the window, and which has a lens barrel whose optical axis is to extend outward of the vehicle, wherein the camera and the bracket constitute:

a snap-fit joint mechanism that establishes a snap-fit joint therebetween according to an insertion direction that is parallel to a direction corresponding to a projection of the optical axis on the mounting face;

a pressing mechanism that performs pressing, by way of a snap-fit claw that constitutes the snap-fit joint mechanism, in a direction in which an interval between the mounting face and an opposite face of the camera that faces the mounting face is increased; and a holding mechanism that holds the interval between the opposite face and the mounting face, against said pressing; and wherein, on the snap-fit claw, a main engagement face for achieving main engagement in the snap-fit joint, and a sub engagement face having an inclination with respect to the insertion direction that is less than that of the main engagement face, and serving to convert a part of a force at said pressing to a force in the insertion direction, are created.

2. The in-vehicle camera of claim 1, wherein, as the pressing mechanism, an elastic pressing part is provided on which the snap-fit claw is formed at its head portion and which extends from the mounting face so as to become farther from the mounting face as it goes forward in the insertion direction, said elastic pressing part being elastically deformed in a fitting direction to the opposite face when the opposite face is made close to the mounting face; and wherein, as the holding mechanism, a support protrusion formed on the camera and protruding in a direction parallel to the opposite face and a hook-shaped part formed on the bracket are provided, said hook-shaped part being provided with an open space spreading in a same direction as the insertion direction, and serving to hook the support protrusion when the snap-fit joint is established.

3. The in-vehicle camera of claim 1, wherein the inclination of the sub engagement face with respect to the insertion direction is at an angle closer to 45° than to 90° and 0°.

4. The in-vehicle camera of claim 2, wherein the inclination of the sub engagement face with respect to the insertion direction is at an angle closer to 45° than to 90° and 0°.

5. The in-vehicle camera of claim 1, wherein a projected area of the sub engagement face on a plane perpendicular to the insertion direction is one-fourth or more of a projected area of the main engagement face on that plane.

6. The in-vehicle camera of claim 2, wherein a projected area of the sub engagement face on a plane perpendicular to the insertion direction is one-fourth or more of a projected area of the main engagement face on that plane.

7. The in-vehicle camera of claim 3, wherein a projected area of the sub engagement face on a plane perpendicular to the insertion direction is one-fourth or more of a projected area of the main engagement face on that plane.

8. The in-vehicle camera of claim 1, wherein a pair of snap-fit joint mechanisms, each being said snap-fit joint mechanism, are provided to be plane-symmetric about an optical-axis plane perpendicular to the opposite face and including the optical axis, and to be apart from the lens barrel.

9. The in-vehicle camera of claim 2, wherein a pair of snap-fit joint mechanisms, each being said snap-fit joint mechanism, are provided to be plane-symmetric about an optical-axis plane perpendicular to the opposite face and including the optical axis, and to be apart from the lens barrel.

10. The in-vehicle camera of claim 3, wherein a pair of snap-fit joint mechanisms, each being said snap-fit joint mechanism, are provided to be plane-symmetric about an optical-axis plane perpendicular to the opposite face and including the optical axis, and to be apart from the lens barrel.

11. The in-vehicle camera of claim 4, wherein a pair of snap-fit joint mechanisms, each being said snap-fit joint mechanism, are provided to be plane-symmetric about an optical-axis plane perpendicular to the opposite face and including the optical axis, and to be apart from the lens barrel.

12. The in-vehicle camera of claim 8, wherein, in the snap-fit joint mechanism, a receiving face for achieving engagement with the main engagement face forms an angle in a plane parallel to the opposite face so as to be orthogonal to the optical-axis plane.

13. The in-vehicle camera of claim 9, wherein, in the snap-fit joint mechanism, a receiving face for achieving engagement with the main engagement face forms an angle in a plane parallel to the opposite face so as to be orthogonal to the optical-axis plane.

14. The in-vehicle camera of claim 10, wherein, in the snap-fit joint mechanism, a receiving face for achieving engagement with the main engagement face forms an angle in a plane parallel to the opposite face so as to be orthogonal to the optical-axis plane.

15. The in-vehicle camera of claim 8, wherein, in the snap-fit joint mechanism, a receiving face for achieving engagement with the main engagement face, forms an angle in a plane parallel to the opposite face so as to be oblique to a plane perpendicular to the optical-axis plane.

16. The in-vehicle camera of claim 9, wherein, in the snap-fit joint mechanism, a receiving face for achieving engagement with the main engagement face, forms an angle in a plane parallel to the opposite face so as to be oblique to a plane perpendicular to the optical-axis plane.

17. The in-vehicle camera of claim 10, wherein, in the snap-fit joint mechanism, a receiving face for achieving engagement with the main engagement face, forms an angle in a plane parallel to the opposite face so as to be oblique to a plane perpendicular to the optical-axis plane.

18. The in-vehicle camera of claim 1, wherein the bracket and the camera further constitutes a mating structure by which they are mated with each other in a direction that is perpendicular to a direction in which the opposite face goes away from the mounting face, and that is also perpendicular to the insertion direction.

19. The in-vehicle camera of claim 2, wherein the bracket and the camera further constitutes a mating structure by which they are mated with each other in a direction that is perpendicular to a direction in which the opposite face goes away from the mounting face, and that is also perpendicular to the insertion direction.

20. The in-vehicle camera of claim 3, wherein the bracket and the camera further constitutes a mating structure by which they are mated with each other in a direction that is perpendicular to a direction in which the opposite face goes away from the mounting face, and that is also perpendicular to the insertion direction.

* * * * *